INVENTOR.
HENRY J. BRETTRAGER
BY
ATTORNEYS

United States Patent Office 3,069,050
Patented Dec. 18, 1962

3,069,050
PALLET DISPENSING APPARATUS
Henry J. Brettrager, 5410 East St., Saginaw, Mich.
Filed July 16, 1959, Ser. No. 827,998
4 Claims. (Cl. 221—224)

This invention relates to apparatus for dispensing pallets and more particularly to apparatus of the kind adapted to dispense pallets from the bottom of a stack of pallets and start them on their way to a predetermined location.

The use of automated equipment in the manufacture, assembly, and packaging of articles of manufacture has greatly increased the use of material supporting pallets on which the work is supported as it moves from station to station. Such pallets either remain with the goods when the latter are shipped or are separated from the goods at the conclusion of a series of operations and returned to a zone where they are reloaded or otherwise conditioned for association with articles to be supported. In either case, it is customary at the beginning of manufacturing or like operations for a large number of empty pallets to be stacked one atop another in readiness for use. In the absence of apparatus for dispensing pallets individually from the stack, it is necessary for a workman to remove one or more pallets from the stack either manually or by means of a fork lift truck or the like. Dispensing of pallets in this manner not only can be difficult and laborious, but is costly in that it either takes a workman away from his machine or requires an additional workman merely to attend to the dispensing of pallets.

Another disadvantage of most pallet dispensing devices is that they require valuable floor space devoted to nothing more than pallet storage. Apart from this, it is necessary either that personnel or special machinery be employed to move the pallets from the storage place to the line or other location where they are to be used.

In some kinds of operations the pallets eventually are separated from the goods they support and are reused. In other kinds of operations, however, the pallets remain with the goods and are shipped with the goods. In those instances where the pallets are adapted for reuse, the pallets usually are made of wood slats or some other, similar light material and it frequently happens that one or more slats of the pallets become broken, chipped or cracked. This does not necessarily means that the pallets are not usable in such condition, but if the pallets are to be dispensed by mechanical means, it may be that the presence of a broken or cracked slat would interfere with the dispensing mechanism.

In those instances where the pallets remain with the goods they support, the pallets usually are made of more flimsy material such as cardboard or the like. When handling pallets made of such material, the pallets must be supported over a fairly large area in order to prevent tearing or rupture of the material forming the pallets.

An object of this invention is to provide pallet dispensing apparatus which is constructed as to enable the pallets to be supported directly over conveying apparatus so as to enable pallets to be dispensed directly to the conveyor and conducted by the latter to their zones of use.

Another object of the invention is to provide pallet dispensing apparatus which is capable of dispensing pallets formed of different kinds of materials.

A further object of the invention is to provide apparatus capable of dispensing pallets which may be damaged to some extent.

A still further object of the invention is to provide dispensing apparatus which is capable of dispensing pallets alternately in opposite directions.

Yet another object of the invention is to provide pallet dispensing apparatus which is adjustable so as to handle pallets of differing size.

Other objects and advantages of the invention will be pointed out specifically or will become apparent from the following description when it is considered in conjunction with the appended claims and the accompanying drawings, in which:

FIGURE 4 is a sectional view taken on the line 4—4 of FIGURE 1;

Figure 8:
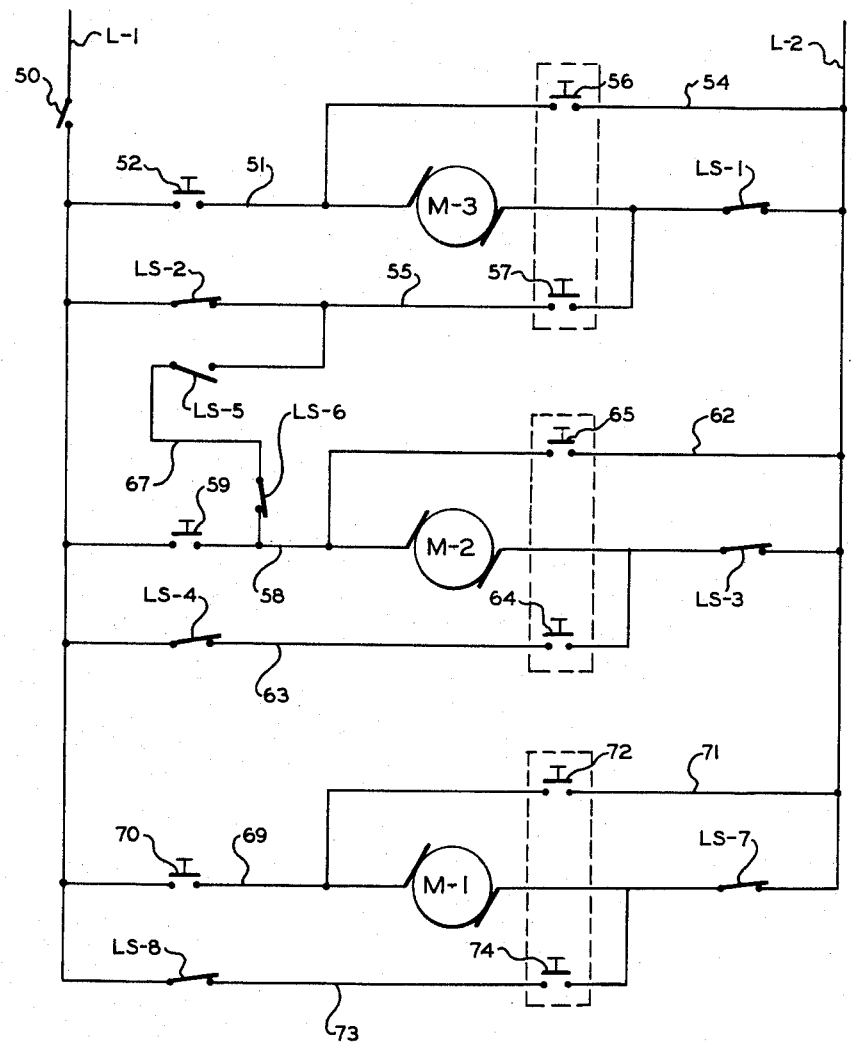

FIGURES 5, 6, and 7 are views similar to FIGURE 4, but on a reduced scale, and illustrating the operation of the apparatus; and FIGURE 8 is a schematic wiring diagram of an illustrative electrical arrangement for operating the dispensing mechanism.

Apparatus formed in accordance with the invention comprises a base frame 1 formed of a number of channel or other suitable members 2 welded or otherwise connected one to another to form a rigid base. In the illustrative embodiment of the invention the frame members 2 support a number of rails 3 on which are mounted pairs of rollers 4 forming a conveyor section 5 on which pallets P may be moved. The conveyor section 5 is preferably furnished as an integral part of the apparatus but could be a part of the conveyor line of the factory or the like in which the dispensing mechanism is adapted for installation.

Figure 1:
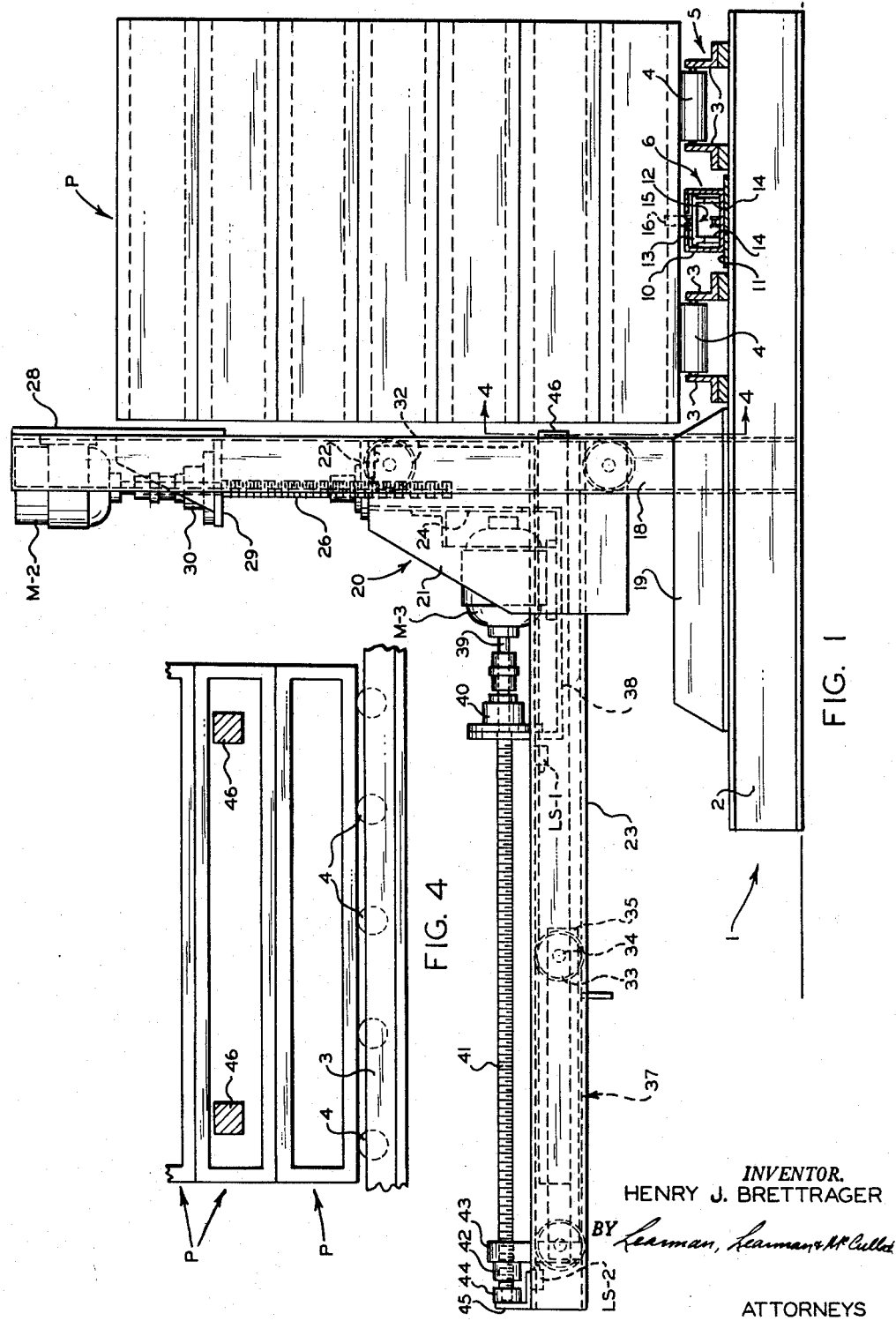
FIGURE 1 is a view partly in side elevation and partly in section of dispensing apparatus constructed in accordance with the invention and associated with conveying mechanism.
Figure 3:
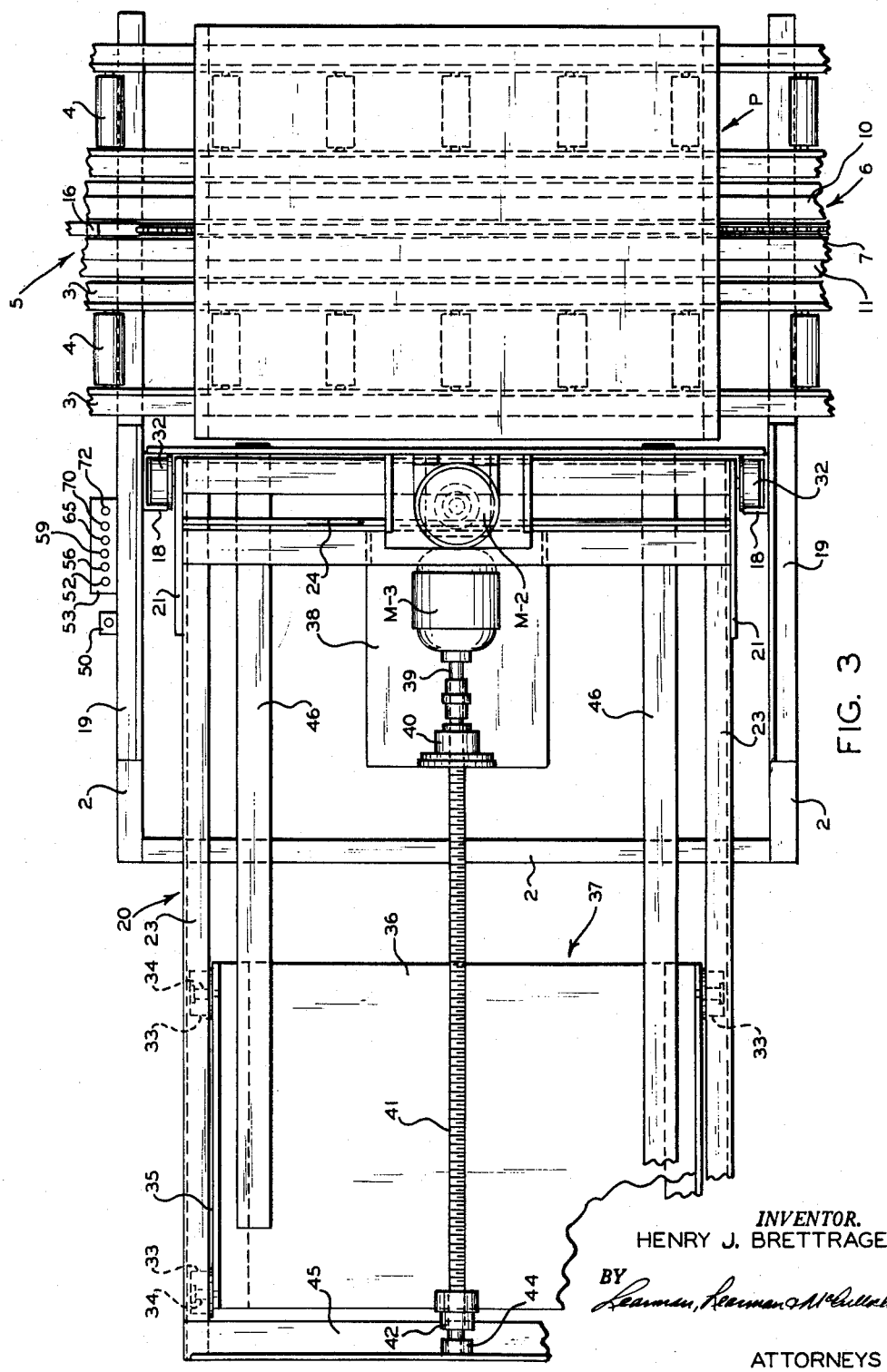
FIGURE 3 is a fragmentary top plan view.

Forming part of the conveyor section 5 is a drive unit 6 which comprises an endless chain 7 trained around a sprocket wheel 8 located at one end of the section 5 and trained around another sprocket wheel 9 at the opposite end of the section 5. As is best shown in FIGURES 1 and 3, the chain 7 is located between the rows of rollers 4 and has its intermediate portion received within a housing 10 that is supported on the frame members 2 by means of a plate 11 or the like. Within the housing 10 is mounted a drive member 12 composed of a channel 13 or the like and secured at its opposite ends to the upper run of the chain 7 so as to move with the latter. The channel 13 includes a pair of depending feet 14 which are adapted to ride along the bottom of the housing 10 to prevent sagging of the upper run of the chain.

The top wall of the housing 10 is slotted as at 15 to permit a drive pawl or lug 16 which is screwed into or otherwise secured to the channel 13 to project above the level of the housing 10. The bottom wall of the housing 10 is similarly slotted outwardly of the frame members 2 so as to permit the lower run of the chain 7 to pass out of the housing and around the sprocket wheel 9 and also around the sprocket wheel 8 if the latter has a diameter larger than the size of the housing. The bottom wall of the housing may be equipped with guide strips 17 to facilitate passage of the chain into and out of the housing.

Means for driving the chain 7 may comprise a reversible, electric motor M–1 connected by gearing or the like (not shown) to the sprocket wheel 9. Preferably, the motor includes an electromagnetic brake assembly of conventional construction so that the motor will not coast once it has been disconnected from its power source.

The base 1 supports a pair of vertically extending, parallel, spaced channel members 18 which are welded, bolted, or otherwise suitably secured to the frame members 2 and reinforced by angle members 19 or the like. The members 18 are arranged so that their channels face one another and provide tracks in which a vertically reciprocable carriage assembly 20 is adapted to ride. The carriage assembly 20 includes a pair of end plates 21 which are rigidly maintained in spaced apart relation at their upper ends by a transverse beam 22 that may be welded to the plates 21. Near their lower ends, the plates 21 have welded thereto a pair of rearwardly extending channel members 23 to the upper flanges of which and to the side plates 21 is welded a second transverse beam 24. Fixed on the beams 22 and 24 is a ball nut 25 which threadedly receives a vertically extending screw element 26 that is adapted for rotation by means of an electric motor M–2 similar to the motor M–1. The motor is fixed in a support 27 which in turn is fixed to a plate 28 that is welded or otherwise secured to the upper ends of the channels 18, the support 28 also mounting a bracket 29 which in turn supports a gear reduction unit 30 of conventional construction to which both the screw 26 and the drive shaft 31 of the motor M–2 are connected. Each of the side plates 21 is equipped with a pair of vertically spaced rollers 32 which are adapted to roll inside the channels 18, the arrangement being such that rotation of the screw 26 in one direction or the other by the motor M–2 causes raising or lowering of the carriage 20.

It will be recalled that the rearwardly extending channel members 23 are fixed to the side plates 21. Consequently, the channels 23 raise and lower with the carriage 20. Mounted in each of the channels 23 is a pair of wheels or rollers 33, each of the rollers 33 being mounted on a spindle 34 which is anchored to an adjacent angle member 35 or the like, the members 35 being spanned by and welded or otherwise suitably secured to a horizontal platform 36. The platform 36, the elements 33–35, and other structure yet to be described form a substantially horizontally reciprocable carriage 37 which functions in a manner and for a purpose presently to be explained.

The vertically reciprocating carriage 20 carries a mounting bracket 38 on which is supported an electric motor M–3 similar to the other motors and arranged in such manner that its drive shaft 39 extends rearwardly. The shaft 39 is coupled to a speed reduction unit 40 supported at the rear end of the bracket 38, and to the reduction unit 40 also is coupled a substantially horizontal screw element 41 which extends through a ball nut unit 42 fixed to a support 43 which in turn is rigidly fixed to the rear end of the carriage 37. The rear end of the screw 41 is rotatably received in a suitable housing 44 which is supported on a cross beam 45 welded or otherwise suitably secured at the rear ends of the channel members 23. The construction and arrangement of the carriage 37 and its associated parts are such that rotation of the screw 41 in one direction or the other by the motor M–3 will cause movement of the carriage 37 forwardly or rearwardly along the track members 23.

Figure 2:
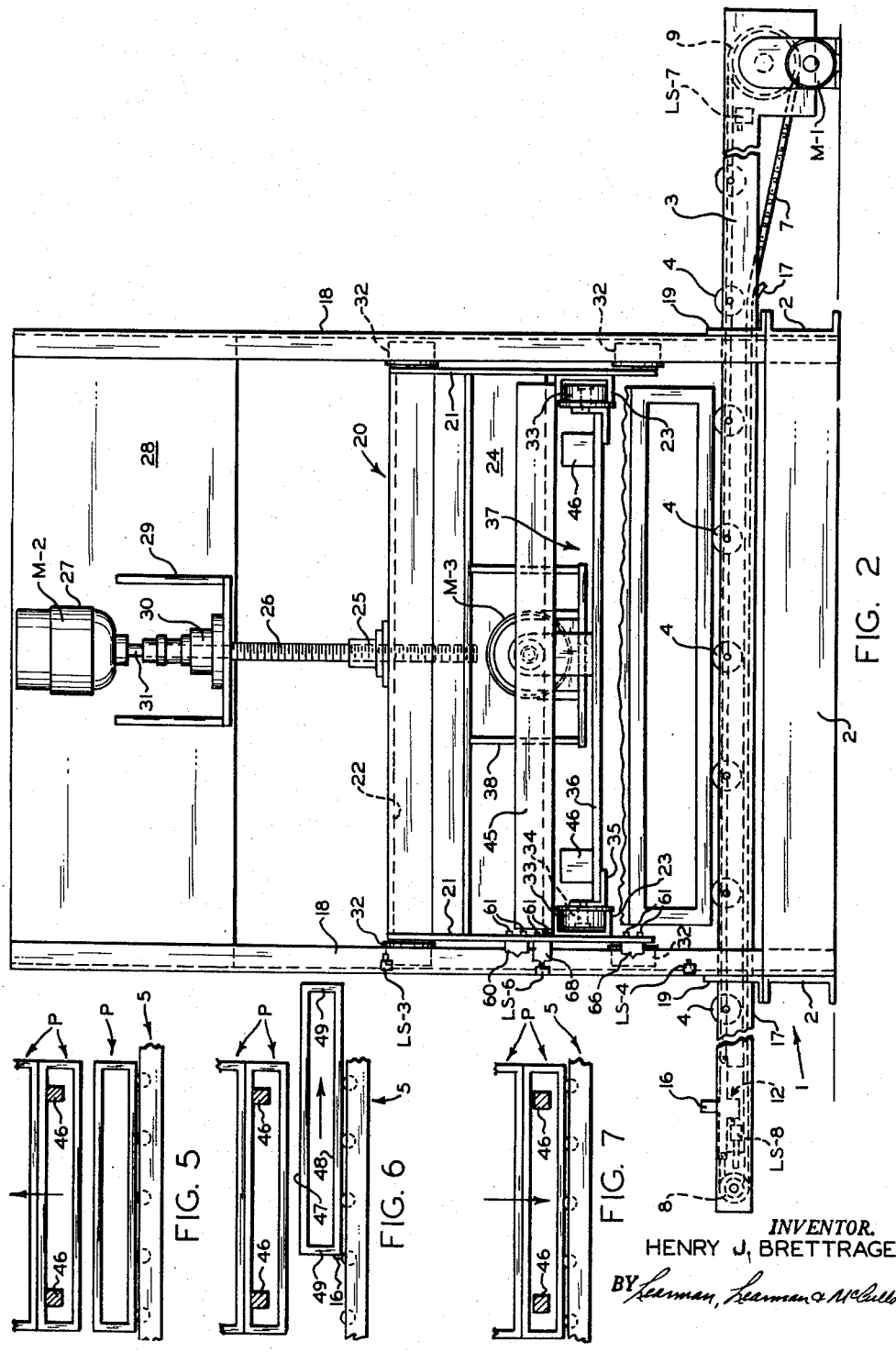
FIGURE 2 is a fragmentary front elevational view.

As is best illustrated in FIGURES 2 and 3, the horizontal carriage 37 has welded or otherwise fixed to the upper surface of the plate 36 a pair of spaced, forwardly projecting, tine or fork-like elements 46 which are arranged to straddle the motor M–3 and which move forwardly and rearwardly with the carriage 37 towards and away from a stack of pallets supported on the conveyor 5. The particular cross sectional shape of the members 46 will depend on the kind of pallets being used. In the illustrative embodiment of the invention, the pallets P are generally box-shaped members having spaced upper and lower surfaces 47 and 48, respectively, joined to one another by end walls 49, but having no side walls. Thus, each pallet has an interior space which is of such size as to receive freely the forks 46.

The apparatus described thus far preferably is operated exclusively by electrical means rather than by hydraulic or pneumatic devices inasmuch as there are considerably less installation and maintenance problems encountered with electrical apparatus. One example of an electrical system which could be incorporated in the dispensing apparatus is disclosed schematically in FIGURE 8 as including power lines L–1 and L–2 connected to a source of electric energy (not shown), one of the power lines having a main switch 50 located therein. The switch 50 may be mounted in any convenient place such as at one side of the machine frame, as is indicated in FIGURE 3. The motor M–3, which is operable to drive the horizontal carriage 37 and the lift forks 46, is connected in a line 51 which bridges the power lines and which includes a normally open push button switch 52 and a normally closed limit switch LS–1. The push button 52 may be located on a control panel 53 located adjacent to the main switch 50 and the switch LS–1 may be located on the bracket 38 which supports the motor M–3. The location of the switch LS–1 is such that it is adapted to be engaged and opened by the ball nut support 43 when the carriage 37 has been moved to its forward position from the position shown in FIGURE 1. A line 53 connects the power line L–2 to one side of the motor M–3 and another wire 54 connects the opposite terminal of the motor M–3 to the power line L–1 through a normally closed limit switch LS–2. Located in the lines 54 and 55 is a pair of manually operable switches 56, 57 which normally are open but which are operable as a unit. The switches 56 and 57 also may be located on the panel 53. The limit switch LS–2 is mounted on the cross member 45 at the rearward ends of the track members 23 and is located so as to be actuated by the ball nut support 43 when the latter is in the position indicated in FIGURE 1.

The lift motor M–2 is connected across the power lines L–1 and L–2 by a wire 58 which includes a normally open push button 59 and a normally closed limit switch LS–3. The push button 59 may be located on the control panel 53 and the limit switch LS–3 may be mounted on one of the vertical track members 18 in such position as to be engaged and opened by a cam 60 mounted on and movable with the associated side plate 21. The cam 60 and the limit switch LS–3 preferably are relatively adjustable so as to vary the time at which the switch is opened and in the disclosed embodiment the cam 60 is mounted on the plate 21 by screws 61 which are movable in a slot formed in the side plate 21. The motor M–2 is connected across the lines L–2 and L–1 by wires 62 and 63, the latter including a normally closed limit switch LS–4 and, also, a normally open push button switch 64 which operates with a similar push button switch 65 located in the line 62. One of the switches 64, 65 may be located on the control panel 53 and the limit switch LS–4 may be located on the vertical track member 18 adjacent to its lower end so as to be opened by a cam 66 mounted on the plate 21 in a manner similar to the mounting of the cam 60.

The lines 55 and 58 are bridged by a wire 67 in which is located a normally open limit switch LS–5 and a normally closed limit switch LS–6. The switch LS–5 preferably is located adjacent to the switch LS–2 and is actuated by the member 43 at the same time the switch LS–2 is actuated. The switch LS–6 preferably is mounted on the vertical column 18 and is adapted to be engaged by an adjustable cam 68 which is mounted on the side plate 21.

The conveyor motor M–1 is connected across the lines L–1 and L–2 by a wire 69 which includes a normally open push button switch 70 and a normally closed limit switch LS–7. The switch 70 may be located on the control panel 53, whereas the limit switch LS–7 is mounted on the chain housing 10 in a position to be engaged by the driving unit 12. The motor M–1 also is connected to the lines L–2 and L–1 by means of a wire 71 containing a normally open push button switch 72, and a wire 73 containing a normally closed limit switch LS–8 and a push button switch 74 operable with the switch 72. The switch 72 preferably is located on the control panel 53 whereas the limit switch LS–8 is located on the chain housing 10 at the opposite end of the latter from the switch LS–7 and in the path of the driver 12.

For the most part, the individual motors are disclosed as being adapted for sequential operation under the control of an operator. The electrical apparatus has been disclosed in this manner for the sake of simplicity, but it will be understood that in actual practice the several electrical components may be operated cyclically and automatically upon the closing of the main switch.

To condition the apparatus for operation, a number pallets P are deposited by a fork lift truck or the like on the conveyor section 5. The pallets will be supported by the conveyor 5 in a vertical stack until such time as it is required that one of the pallets be dispensed from the stack.

When a pallet is required, the motor M–3 is actuated to drive the carriage 37 forwardly from its position shown in FIGURES 1 and 3, and forward movement of the carriage 37 will cause the fork members 46 to project through the opening in one of the pallets P. In this connection, it will be noted from FIGURES 1, 2 and 4 that the carriage 37 is so located relatively to the stack of pallets that forward movement of the fork members 46 causes them to project through the opening in the pallet which is second from the bottom of the stack. Forward movement of the carriage 37 continues until such time as the switch LS–1 is opened, at which time the motor M–3 stops. At this time the forks 46 will have been projected a substantial distance through the adjacent pallet.

When the forks have been moved to their projecting positions, the lift motor M–2 may be driven in such direction as to cause lifting or raising of the carriage 37 and the forks 46. Raising of the forks 46 will lift all of the pallets above the lowest pallet so that only the lowest pallet is supported on the conveyor section 5, as is indicated in FIGURE 5. Upward movement of the carriage 37 continues until such time as the switch LS–3 is opened. At this time, the motor M–1 may be started so as to cause movement of the upper run of the chain 7 from left to right, as viewed in FIGURES 2 and 6. Such movement of the chain will cause the drive pawl 16 to engage one end of the single pallet supported on the conveyor section and drive it to the right as is indicated in FIGURE 6. Driving of the pallet continues until such time as the switch LS–7 is opened and at this time the pallet will have been delivered to another conveyor (not shown).

When the lowest pallet has been removed from the stack, the motor M–2 may be started by closing the switches 64 and 65, thereby causing the motor to be driven in the opposite direction so as to lower the carriage 37 and the pallets supported on the forks 46. It is necessary that the carriage 37 be lowered to a level such that the pallet engaged by the forks 46 rests on the conveyor section 5 or, stated differently, the carriage 37 must be lowered to a position lower than it was originally. Lowering of the carriage 37 will continue until the switch LS–4 is opened by the cam 66 and the cam will have been so adjusted as to open the switch when the lowest pallet of the stack of remaining pallets is supported solely by the conveyor section 5.

At the time the stack of remaining pallets again is supported on the conveyor section, the switches 56 and 57 may be closed so as to drive the motor M–3 in a direction to cause the carriage 37 to be moved rearwardly and the forks 46 retracted from the pallet. Rearward movement of the carriage 37 continues until such time as the switch LS–2 is opened, thereby breaking the circuit to the motor M–3. At this time, the switch LS–5 is closed and power is supplied through the line 67 to the lift motor M–2 to cause it to raise the carriage 37 to its original position as determined by the relative locations of the switch LS–6 and the cam 68. In these positions of the parts the apparatus is again in readiness to dispense another pallet from the bottom of the stack.

It will be recalled that the conveyor motor M–1 was stopped upon opening of the switch LS–7. Thus, the drive pawl 16 now will be located at the right hand end of the conveyor 5, as viewed in FIGURE 2, so that the second pallet to be dispensed from the stack will be driven to the left, as viewed in FIGURES 2 and 6. If it is desired to dispense pallets in one direction only, however, the drive pawl 16 may be returned to its left hand position by operation of the switches 72 and 74 prior to the lowering of the carriage 37 and the pallets supported thereby. Thus, the dispensing apparatus is capable of dispensing pallets either in one direction only or alternately in opposite directions.

As is indicated in FIGURES 5–7, the forks 46 are rather widely spaced from one another. As a result, there is little or no danger of the stack of pallets tilting and toppling during lifting or lowering of the stack. Moreover, the forks are adapted to be extended a substantial distance through the stack so as to provide a fairly large area of support for the pallets. Consequently, the presence of a broken slat or the like will not interfere with the operation of the dispensing apparatus and the apparatus is capable of use with pallets formed of such light material as cardboard.

The operating levels of the carriage 37 and the forks 46 may be varied by relative adjustment of the switches LS–3, LS–4, LS–6 and their associated cams, thereby enabling the apparatus to be usable with pallets of greatly varying size.

The disclosed embodiment is representative of a presently preferred form of the invention, but is intended to be illustrative rather than definitive thereof. The invention is defined in the claims.

I claim:

1. Apparatus for dispensing pallets from the bottom of a stack of pallets arranged one atop another, each of said pallets having a material supporting surface spaced vertically from the material supporting surface of the adjacent pallets, said apparatus comprising a frame having a base; a carriage slidably mounted on said frame; a pair of parallel, spaced apart, elongate tine members having a length corresponding substantially to the width of a pallet in said stack; screw threaded means reacting between said tine members and said carriage operable to reciprocate said tine members fore and aft from a first position in which said tine members are wholly outward of said stack of pallets to a second position in which said tine members extend a substantial distance into said stack, and return; first drive means connected to said screw threaded means for operating the latter; screw threaded mechanism reacting between said carriage and said frame operable to raise said carriage from a normal position in which said tine members are aligned with a selected space between two of said pallets to an elevated position above said normal position; second driving means connected to said mechanism for operating the latter in response to movement of said tine members into said stack of pallets, whereby all pallets above the level of said tine members are raised; conveyor means supported at the base of said frame and on which said stack of pallets normally is supported; third driving means connected to said conveyor means and operable to drive the latter in response to movement of said carriage to said elevated position for conducting away all pallets below the level of said tine members.

2. The apparatus set forth in claim 1 wherein said second driving means is reversible and operable in response to operation of said conveyor means to move said carriage to a lowered position from said elevated position whereby the pallets above the level of said tine members may be supported on said conveyor means.

3. The apparatus set forth in claim 2 wherein said first drive means is reversible and operable in response to movement of said carriage to said lowered position to withdraw said tine members from said stack.

4. The apparatus set forth in claim 3 including means reacting between said tine members and said second driving means and operable in response to withdrawal of said tine members from said stack to drive said carriage upwardly from said lowered position to said normal position References Cited in the file of this patent

UNITED STATES PATENTS

| | | |
|---|---|---|
| 1,838,167 | Wheeler | Dec. 29, 1931 |
| 2,028,410 | Rapisarda | Jan. 21, 1936 |
| 2,702,132 | Van Doren | Feb. 15, 1955 |
| 2,819,811 | Quayle | Jan. 14, 1958 |
| 2,858,043 | Fenton | Oct. 28, 1958 |
| 2,946,465 | Raynor | July 26, 1960 |
| 2,973,878 | Gibson | Mar. 7, 1961 |